US009113449B2

(12) United States Patent
Jeon (10) Patent No.: US 9,113,449 B2
(45) Date of Patent: Aug. 18, 2015

(54) APPARATUS FOR MANAGING NETWORK ZONE HAVING PLURALITY OF WIRELESS ACCESS POINTS, METHOD OF CONNECTING MOBILE TERMINAL TO WIRELESS ACCESS POINT BY THE APPARATUS, AND THE MOBILE TERMINAL

(71) Applicant: SAMSUNG SDS CO., LTD., Seoul (KR)

(72) Inventor: Young-Sam Jeon, Suwon-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 178 days.

(21) Appl. No.: 13/849,762

(22) Filed: Mar. 25, 2013

(65) Prior Publication Data
US 2013/0250932 A1 Sep. 26, 2013

(30) Foreign Application Priority Data
Mar. 23, 2012 (KR) .................. 10-2012-0029876

(51) Int. Cl.
H04L 12/28 (2006.01)
H04W 72/04 (2009.01)
H04W 48/20 (2009.01)
H04W 16/02 (2009.01)

(52) U.S. Cl.
CPC .............. *H04W 72/04* (2013.01); *H04W 48/20* (2013.01); *H04W 16/02* (2013.01)

(58) Field of Classification Search
None
See application file for complete search history.

(56) References Cited

U.S. PATENT DOCUMENTS

| 2008/0298303 | A1* | 12/2008 | Tsirtsis | 370/328 |
| 2010/0110921 | A1* | 5/2010 | Famolari et al. | 370/252 |
| 2012/0063340 | A1* | 3/2012 | Waters et al. | 370/252 |
| 2012/0088482 | A1* | 4/2012 | Pazhyannur et al. | 455/418 |
| 2012/0252516 | A1* | 10/2012 | Miyabayashi et al. | 455/515 |

* cited by examiner

*Primary Examiner* — Duc C Ho
(74) *Attorney, Agent, or Firm* — Sughrue Mion, PLLC (57) ABSTRACT

Provided are an apparatus for managing a network zone having a plurality of wireless access points (APs), a method of connecting a mobile terminal to an AP by the apparatus, and the mobile terminal. The apparatus for managing a network zone having a plurality of wireless APS includes a group manager configured to classify the plurality of wireless APs into a plurality of AP groups based on AP device information on the APs belonging to the network zone. Each of the plurality of AP groups can cover the entire network zone.

22 Claims, 12 Drawing Sheets

| SUB-AREA (SA) | ESSENTIAL AP | OPTIONAL AP |
|---|---|---|
| SA1 | AP1 | |
| SA2 | | AP2, AP3 |
| SA3 | AP4 | |
| SA4 | | AP5, AP6 |
| SA5 | AP9 | AP7, AP8 |
| SA6 | | AP10, AP11 |

GROUP A : { AP1, AP2, AP4, AP5, AP9, AP10 }
GROUP B : { AP1, AP3, AP4, AP6, AP9, AP11 }
⋮

FIG. 7A

<GROUP MANAGEMENT TABLE>

| | NETWORK ZONE ID | GROUP ID | BELONGING AP | NUMBER OF GROUP USERS | AMOUNT OF GROUP TRAFFIC |
|---|---|---|---|---|---|
| GROUP A | | | AP1, AP3, AP5, AP6, AP8 | | |
| GROUP B | | | AP2, AP4, AP5, AP7, AP9 | | |
| ⋮ | | | | | |

FIG. 7B

<AP MANAGEMENT TABLE>

| | SSID | AP DEVICE INFORMATION | MAC | NUMBER OF CONNECTED USERS | AMOUNT OF TRAFFIC |
|---|---|---|---|---|---|
| AP1 | | | | | |
| AP2 | | | | | |
| ⋮ | | | | | |

FIG. 7C

<USER MANAGEMENT TABLE>

| | TERMINAL ID | MAC | BELONGING GROUP | CONNECTED AP | AMOUNT OF TRAFFIC |
|---|---|---|---|---|---|
| USER 1 | | | | | |
| USER 2 | | | | | |
| ⋮ | | | | | |

FIG. 8

<USER MANAGEMENT TABLE>

| | TERMINAL ID | MAC | IP | AMOUNT OF TRAFFIC |
|---|---|---|---|---|
| USER 1 | | | | |
| USER 2 | | | | |
| ⋮ | | | | |

FIG. 11

APPARATUS FOR MANAGING NETWORK ZONE HAVING PLURALITY OF WIRELESS ACCESS POINTS, METHOD OF CONNECTING MOBILE TERMINAL TO WIRELESS ACCESS POINT BY THE APPARATUS, AND THE MOBILE TERMINAL

CROSS-REFERENCE TO RELATED APPLICATION

This application claims priority to and the benefit of Republic of Korea Patent Application No. 10-2012-29876, filed on Mar. 23, 2012, the disclosure of which is incorporated herein by reference in its entirety.

BACKGROUND

1. Field of the Invention

The present disclosure relates to an apparatus for managing a network zone having a plurality of wireless access points (APs), a method of connecting a mobile terminal to a wireless AP by the apparatus, and the mobile terminal, and more particularly, to a network zone management apparatus that can generate a plurality of AP groups capable of covering an entire network zone and connect a mobile terminal to one of the groups, a mobile terminal connection method for the apparatus, and a mobile terminal connected using the method.

2. Discussion of Related Art

With the recent increase in the number of mobile terminals such as smart phones, smart pads and tablet personal computers (PCs), it has become easy to use the Internet through a wireless fidelity (WiFi) device capable of connecting to a wireless local area network (WLAN).

Wireless APs are provided in various forms such as a personal type, a business type and a small-sized type. When service areas of APs overlap due to an increase in the number of APs, signal interference and operation and management costs increase, and it becomes difficult for users who use the Internet through the APs to efficiently use the network.

Particularly in a downtown area, a plurality of APs are installed to overlap in a limited space, and crosstalk between the APs deteriorates. For example, when connections of users are concentrated on a specific AP, the users do not know that they can be provided with smooth service through other surrounding APs. This results in inefficiency in the use of an entire network.

In addition, when there are several connectable APs around a mobile terminal, the mobile terminal may frequently perform unnecessary handover, which causes data loss and unnecessary delay time.

SUMMARY OF THE INVENTION

The present disclosure is directed to providing a network zone management apparatus capable of appropriately distributing a load of a plurality of access points (APs) in a network zone in which the APs are installed to overlap, and a mobile terminal connection method using the apparatus.

The present disclosure is also directed to providing a network zone management apparatus capable of reducing unnecessary and frequent handover operations of a mobile terminal in a network zone in which a plurality of APs are installed to overlap, and a mobile terminal connection method using the apparatus.

According to an aspect of an exemplary embodiment, there is provided an apparatus for managing a network zone having a plurality of wireless APs, including: a group manager configured to classify the plurality of wireless APs into a plurality of AP groups based on AP device information on the APs belonging to the network zone, wherein each of the plurality of AP groups can cover the entire network zone.

According to an aspect of another exemplary embodiment, there is provided a mobile terminal, including: an AP scanner configured to scan surrounding wireless APs; and a connection manager configured to connect the mobile terminal to a currently connectable AP in an AP list of an AP group assigned to the mobile terminal based on a list of the APs scanned by the AP scanner and the AP list of the group, wherein the assigned predetermined AP group is one of a plurality of AP groups in a network zone having a plurality of APs, and each of the plurality of AP groups can cover the entire network zone.

According to an aspect of another exemplary embodiment, there is provided a method of connecting a mobile terminal to a wireless AP by an apparatus for managing a network zone having a plurality of wireless APs, the method including: acquiring, at the apparatus, AP device information on the APs belonging to the network zone; classifying, at the apparatus, the plurality of APs into a plurality of AP groups based on the AP device information; and assigning the mobile terminal to one of the plurality of AP groups, wherein each of the plurality of AP groups can cover the entire network zone.

According to an aspect of another exemplary embodiment, there is provided a computer-readable recording medium in which a program for causing a computer to execute the mobile terminal connection method is recorded.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

The above as well as additional purposes, features, and advantages of the present disclosure will become apparent in the following exemplary embodiments and accompanying drawings. However, the present disclosure is not limited to the exemplary embodiments disclosed below but can be implemented in various forms. These exemplary embodiments are provided so that this disclosure will be thorough and complete, and will fully convey the scope of this disclosure to those of ordinary skill in the art. As used herein, it will be understood that when an element is referred to as being on another element, it can be directly formed on the other element, or an intervening element may be present.

The terminology used herein is for the purpose of describing embodiments only and is not intended to be limiting of the present disclosure. As used herein, the singular forms "a," "an" and "the" are intended to include the plural forms as well, unless the context clearly indicates otherwise. It will be understood that the terms "include" and/or "including," when used in this specification, do not preclude the presence or addition of one or more other elements.

Hereinafter, the exemplary embodiments of the present disclosure will be described in detail with reference to the drawings. In descriptions of specific embodiments below, various pieces of specific content are presented for purposes of detailed illustration and aid in comprehension of the present disclosure. However, those of ordinary skilled in the art will appreciate that the embodiments can be used without the pieces of specific content. In some cases, content that has been well known in the art but is not closely related to the present disclosure will not be described to prevent confusion.

Figure 1:
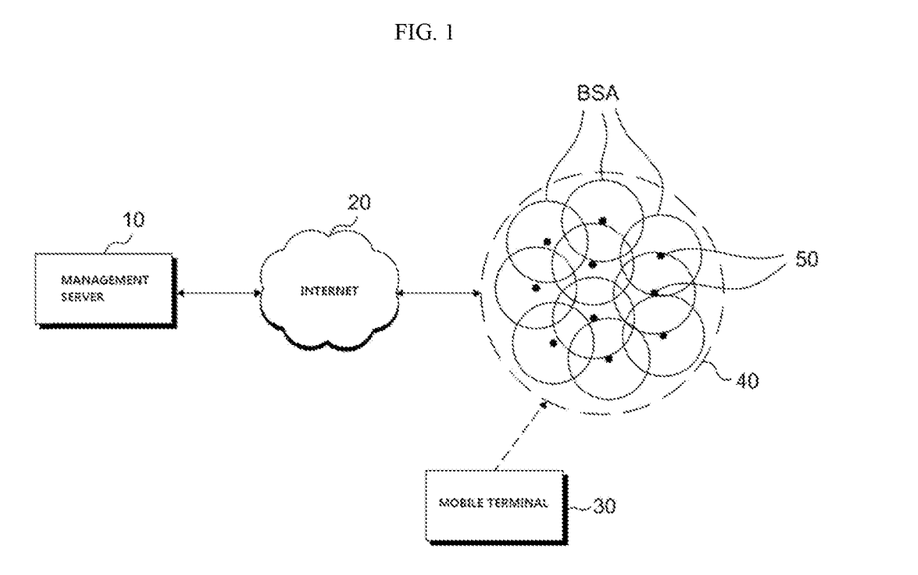
FIG. 1 is a diagram illustrating a connection from a management server according to an exemplary embodiment of the present disclosure to a network zone via a network.

FIG. 1 is a diagram illustrating a connection from a management server according to an exemplary embodiment of the present disclosure to a network zone via a network.

Referring to FIG. 1, a management server 10 may be connected with a plurality of wireless access points (APs) 50 via a network such as the Internet 20.

The management server 10 manages a network zone 40 consisting of the plurality of APs 50, thereby controlling a mobile terminal 30 to connect to one of the plurality of APs 50. Description below will be made on the assumption that the management server 10 manages the one network zone 40, but the management server 10 may manage a plurality of network zones.

The network zone 40 is a management unit that can be managed by the management server 10, and may consist of the plurality of wireless APs 50. Each of the plurality of APs 50 has a basic service area (BSA) of a predetermined range. Each of the APs 50 may be connected with at least one mobile terminal 30 in its BSA and provide a wireless communication path to the mobile terminal 30. In an exemplary embodiment, the APs 50 may be devices that support a wireless local area network (WLAN) according to the Institute of Electrical and Electronics Engineers (IEEE) 802.11 standard, but are not limited thereto.

Figure 2:
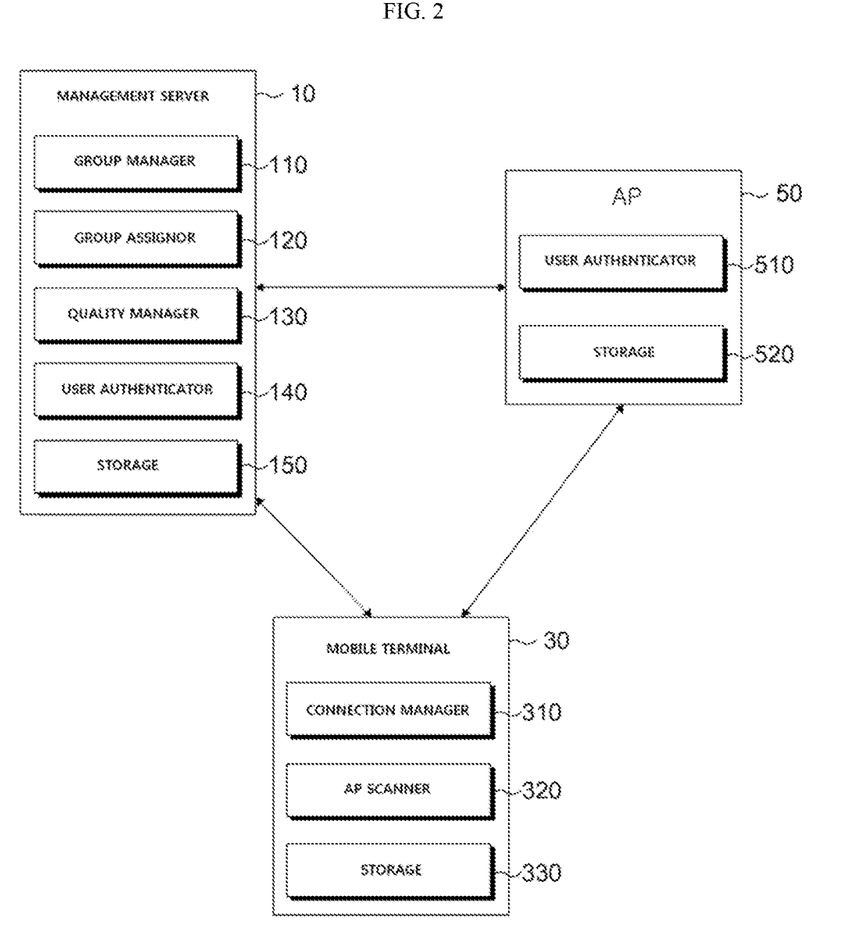
FIG. 2 is a block diagram of a management server, an access point (AP), and a mobile terminal according to an exemplary embodiment of the present disclosure.

FIG. 2 is a block diagram of a management server, an AP, and a mobile terminal according to an exemplary embodiment of the present disclosure.

In an exemplary embodiment, a management server 10 may include a group manager 110, a group assignor 120, a quality manager 130, a user authenticator 140, and a storage 150.

The group manager 110 classifies a plurality of APs 50 constituting a network zone 40 into a plurality of groups (also referred to as "AP groups" below). In other words, the group manager 110 may acquire AP device information from all of the APs 50 in the network zone 40, and classify the APs 50 into a plurality of groups based on the AP device information.

Here, "classifying APs into a plurality of groups" means an operation of generating a plurality of AP groups, each of which may have at least one AP as a member, and assigning each of the APs to at least one AP group among the plurality of AP groups. Here, each AP group covers the entire network zone 40 as service areas. Thus, classification of APs into a plurality of groups should satisfy the following conditions.

1) APs constituting an AP group cover the entire network zone 40.

2) One AP may be assigned to at least one AP group as a member.

3) One AP group includes at least one AP as a member.

The group manager 110 generates a plurality of groups that satisfy the conditions, gives group identifiers (IDs) to the respective groups, and generates a list of APs belonging to each group (also referred to as "AP list of a group").

In the above description of the exemplary embodiment, the group manager 110 classifies the APs 50 into a plurality of groups based on AP device information acquired from the APs 50 in the network zone 40, but in an alternative embodiment, the group manager 110 may indirectly acquire at least a part of AP device information from a plurality of user terminals 30 located in the network zone 40 and use the information to classify the APs 50 into a plurality of groups. For example, each mobile terminal 30 may transmit signal levels of APs received while moving in the network zone 40, and the management server 10 may acquire information on a service area of each AP from the information.

The group assignor 120 assigns a mobile terminal entering the network zone 40 to one of the plurality of AP groups. In an exemplary embodiment, the management server 10 may receive real-time information such as the current number of connected users or the current amount of traffic of each AP 50 from the AP 50, and the group assignor 120 may assign each mobile terminal to one of the plurality of AP groups based on the real-time information.

The quality manager 130 may function to manage quality of service (QoS) of communication in the network zone 40. For example, the quality manager 130 may receive quality data such as the total amount of traffic, latency, and the number of connected users of the APs 50 constituting the network zone 40, and manage the overall QoS of the network zone 40 or manage QoS according to the APs 50 in the network zone 40. According to exemplary embodiments, the quality manager 130 may be selectively included in the management server 10.

The user authenticator 140 performs an authentication process for a user who enters the network zone 40. For example, before a user enters the network zone 40 and is assigned an AP group, the user authenticator 140 may determine whether the user has already been assigned an AP group. Additionally, the user authenticator 140 may process authentication for connections to the respective APs 50, or authentication for use of a specific service. According to exemplary embodiments, the user authenticator 140 may be selectively included in the management server 10.

Figure 7A:
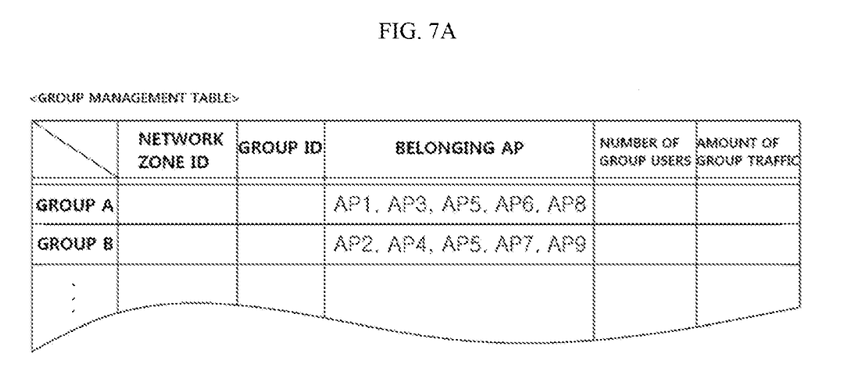
FIG. 7A to FIG. 7C schematically show a group management table, an AP management table, and a user management table that can be stored in a management server according to an exemplary embodiment of the present disclosure, respectively.

The storage 150 is a storage means for storing data necessary for operation of the group manager 110, the group assignor 120, the quality manager 130, and the user authenticator 140, and may be a volatile memory and/or a non-volatile memory. In an exemplary embodiment, the storage 150 may include data for classifying a plurality of APs into AP groups and managing the AP groups, and data for assigning one of the AP groups to each user and managing the group. Data that can be stored in the storage 150 will be described later with reference to FIG. 7.

In an exemplary embodiment, each of the APs 50 may include a user authenticator 510 and a storage 520.

The user authenticator 510 is a component that can be selectively included in the AP 50 according to an exemplary embodiment, and may perform an authentication process for a user who connects to the AP 50. For example, when the AP 50 belongs to a specific AP group, and a user attempts to connect to the AP 50, the user authenticator 510 may determine whether the user is a user having been assigned the specific AP group and determine whether or not to permit connection of the user.

The storage 520 is a storage means for storing data necessary for the AP 50 to function as a general AP, and may be a volatile memory and/or a non-volatile memory. For example, the storage 520 may store information including a terminal ID, a media access control (MAC) address, an Internet protocol (IP) address, etc. of a user who connects to the AP 50. Additionally, the storage 520 may store data necessary for operation of the user authenticator 510.

In an exemplary embodiment, the mobile terminal 30 may include a connection manager 310, an AP scanner 320, and a storage 330.

The connection manager 310 checks whether a currently connectable AP is in an AP list of a group assigned to the mobile terminal 30 based on a list of APs scanned by the AP scanner 320, and the AP list of the group. When there are a least two currently connectable APs, the connection manager 310 selects one of the APs, and causes the mobile terminal 30 to connect to the selected AP.

The AP scanner 320 may generate a "scanned AP list" by scanning APs to which the mobile terminal 30 can connect. The AP scanner 320 may perform any kind of operation from passive scanning, in which the AP scanner 320 receives beacon signals periodically transmitted by APs and makes a scanned AP list, to active scanning, in which the AP scanner transmits a request signal to surrounding APs, receives AP signals responding to the request signal, and makes a scanned AP list.

The storage 330 is a storage means for storing data necessary for operation of the connection manager 310 and the AP scanner 320, and may be a volatile memory and/or a non-volatile memory. In an exemplary embodiment, the storage 330 may store an AP list that the connection manager 310 receives from the management server 10, and also the list of APs scanned by the AP scanner 320.

In the constitution as described above, the mobile terminal 30 may request AP connection from one of the management server 10 and the AP 50. The AP 50 may transmit real-time information such as AP device information, the number of connected users and the amount of traffic to the management server 10.

Based on AP device information received from all the APs 50 in the network zone 40, the group manager 110 of the management server 10 classifies the APs 50 into a plurality of groups. In other words, the group manager 110 gives a group ID to each group, and generates an AP list of the group. Additionally, the management server 10 may transmit information on a group, to which each AP 50 belongs, to the AP 50.

When the management server 10 receives an AP connection request from the mobile terminal 30, the group assignor 120 may assign one of the AP groups to the terminal 30. The management server 10 transmits information on the assigned group to the terminal 30, and at this time, the information on the group may be an AP list of the group.

Figure 3:
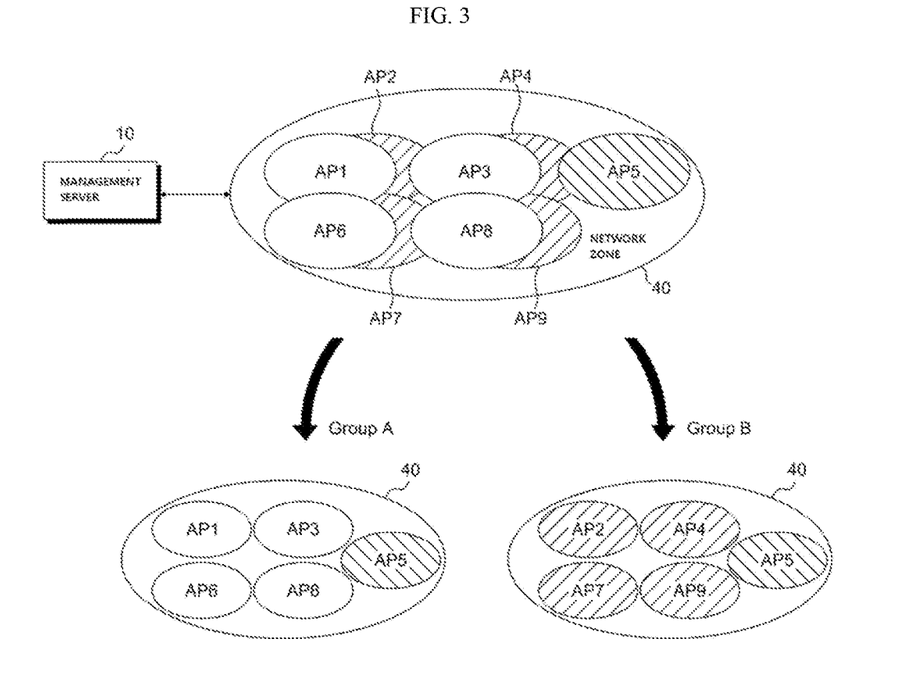
FIG. 3 is a diagram schematically illustrating grouping of APs in a network zone according to an exemplary embodiment of the present disclosure.

FIG. 3 is a diagram schematically illustrating grouping of APs in a network zone according to an exemplary embodiment of the present disclosure.

For convenience of description, it is assumed in the exemplary embodiment of FIG. 3 that the management server 10 manages one network zone 40, and nine APs (AP1 to AP9) are distributed in the network zone 40. Also, it is assumed that service areas of AP1 and AP2, those of AP3 and AP4, those of AP6 and AP7, and those of AP8 and AP9 overlap, but that of AP5 does not overlap that of any AP.

The group manager 110 of the management server 10 acquires AP device information on all the APs (AP1 to AP9). Here, the AP device information includes unique device information, for example, locations (physical locations and/or relative locations), the maximum numbers of connected users, sizes of service areas, and available connection methods of the APs.

Based on such device information, the group manager 110 classifies the APs into a plurality of groups. In the illustrated exemplary embodiment, the group manager 110 classifies the APs in the network zone 40 into two groups (group A and group B). In this exemplary embodiment, group A includes AP1, AP3, AP5, AP6 and AP8 as its members, and group B includes AP2, AP4, AP5, AP7 and AP9 as its members. Here, AP5 is included as a member in both of the groups because there is no replaceable AP in an area in which AP5 is located. Thus, each of group A and group B should include AP5 to cover the entire area of the network zone 40.

When a plurality of users enter the network zone 40 after the group manager 110 classifies the APs in the network zone 40 into two groups in this way, the group assignor 120 assigns one of group A and group B to each user. For example, the group assignor 120 may determine an assigning order of respective groups and assign the groups to respective users according to the assigning order, or alternatively, may assign a user to a group having lesser load (the number of connected users or the amount of traffic) based on real-time information such as the number of connected users and/or the amount of traffic of an AP.

Figure 4:
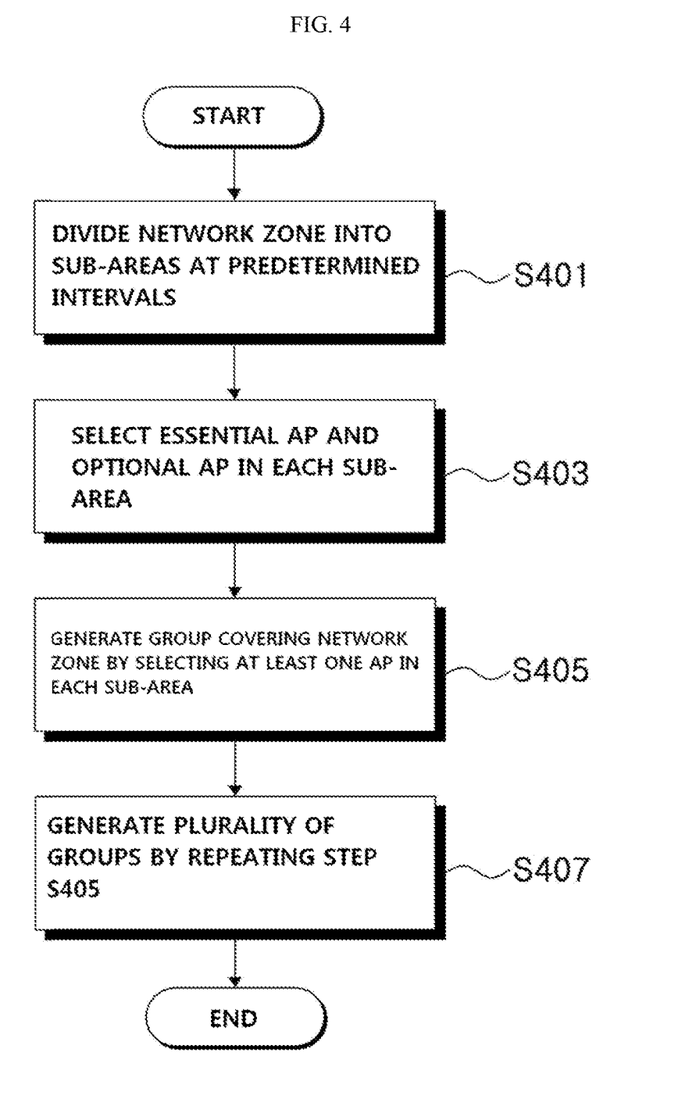
FIG. 4 is a flowchart illustrating a method of grouping APs in a network zone according to an exemplary embodiment of the present disclosure.
Figure 5:
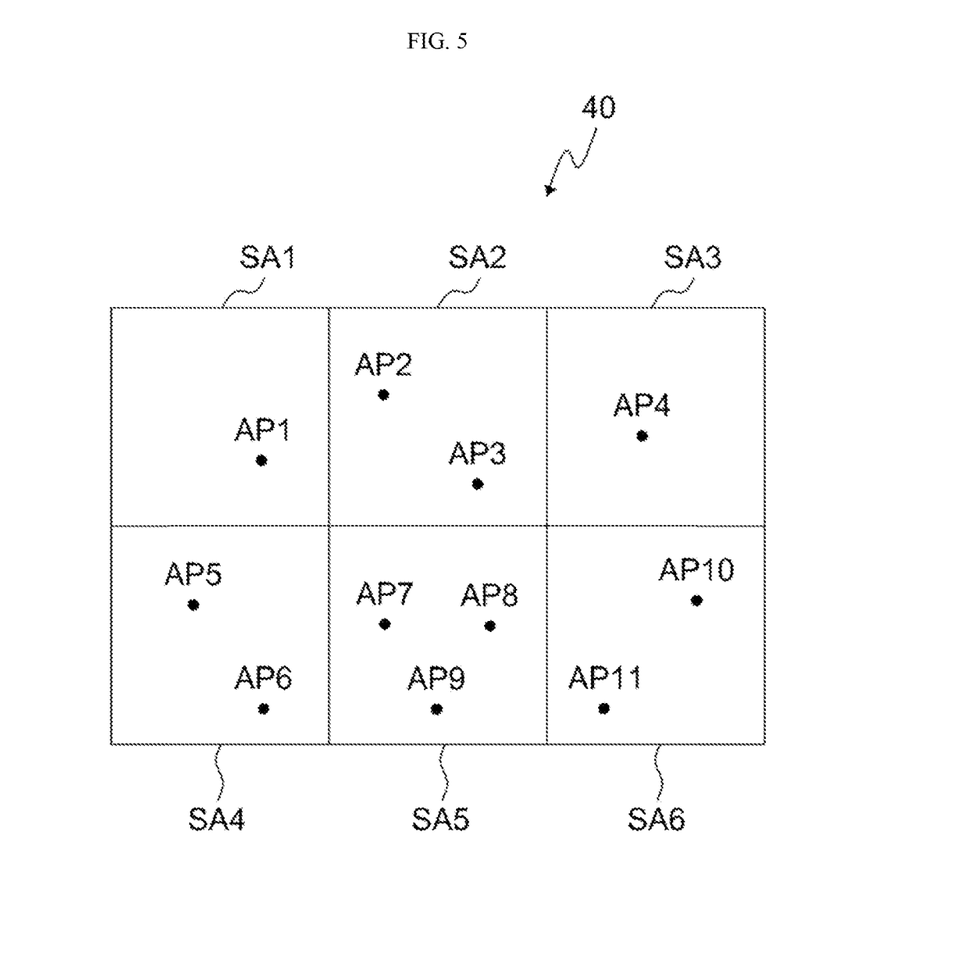
FIG. 5 and FIG. 6 are diagrams illustrating the flowchart of FIG. 4.
Figure 6:
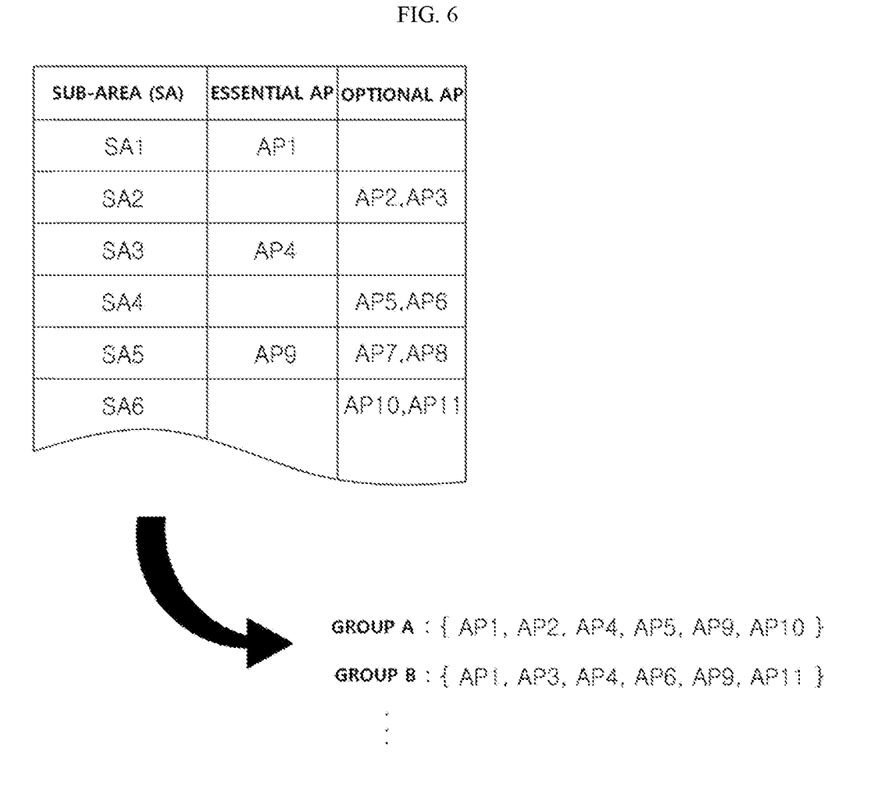

With reference to FIG. 4 to FIG. 6, an exemplary method for the group manager 110 of the management server 10 to classify APs into a plurality of groups will be described below.

FIG. 4 is a flowchart illustrating a method of grouping APs in a network zone according to an exemplary embodiment of the present disclosure, and FIG. 5 and FIG. 6 are diagrams illustrating the flowchart of FIG. 4. The exemplary method is a method of generating AP groups covering an entire network zone 40 by dividing the network zone 40 into a plurality of sub-areas (SAs) and selecting at least one AP in each SA.

First, as shown in FIG. 5, it is assumed that a total of 11 APs (AP1 to AP11) are randomly distributed in the network zone 40. In step S401 of FIG. 4, the group manager 110 divides the network zone 40 into SAs (SA1 to SA6) at predetermined intervals. Sizes of the SAs need not be identical to each other, and a method of dividing the network zone 40 into SAs need not be limited. However, it is preferable to divide the network zone 40 into SAs which each include at least one AP. According to these references, an exemplary embodiment of FIG. 5 shows the network zone 40 divided into the six SAs (SA1 to SA6).

Subsequently, in step S403, the group manager 110 selects an essential AP and an optional AP in each SA. Here, an "essential AP" is an AP that needs to be included in each group upon group classification. For example, when there is only one AP and no replaceable AP in an SA, the AP is an essential AP. On the other hand, when at least two APs are present in an SA and can be replaced with each other, these APs may be "optional APs."

FIG. 6 shows a table of essential APs and optional APs exemplarily selected from APs shown in FIG. 5. Referring to FIG. 5 and FIG. 6, there is one AP (AP1 or AP4) in each of SA1 and SA3, and thus AP1 and AP4 are selected as essential APs. There are two APs in each of SA2, SA4 and SA6, and all the APs are assumed to be optional APs.

There are three APs in SA5, and it is assumed that one (AP9) of them is an essential AP, and the others (AP7 and AP8) are optional APs. Such a situation may occur, for example, when AP9 can cover SA5 but AP7 or AP8 alone cannot cover SA5.

Next, in step S405, at least one AP is selected from each SA, and thereby one AP group that covers the entire network zone 40 is generated. At this time, in each SA, (i) when there is only an essential AP, the essential AP is selected, (ii) when there are only optional APs, at least one of the optional APs is selected, and (iii) when there are an essential AP and optional APs, the essential AP is selected, and none or at least one of the optional AP may be selected. For example, as shown in FIG. 6, AP1, AP4 and AP9 that are essential APs are selected from SA1, SA3 and SA5, and at least one optional AP is selected from each of SA2, SA4 and SA6, so that group A shown in FIG. 6 may be generated.

Subsequently, in step S407, step S405 is repeated a predetermined number of times to generate a plurality of AP groups. For example, all the essential APs are selected like in group A, and some of optional APs excluded from group A are selected, so that group B shown in FIG. 6 may be generated.

Also, by making another combination of optional APs, for example, group C may be generated as follows:

Group C: {AP1, AP2, AP4, AP6, AP7, AP9, AP10}, and in the same way, more groups such as group D and group E may be generated.

The grouping method described above with reference to FIG. 4 to FIG. 6 is an example of various methods for the group manager 110 of the management server 10 to classify APs into a plurality of groups. Thus, in alternative embodiments, the network zone 40 may not be divided into SAs, or APs may not be classified into essential APs and optional APs.

Figure 7B:
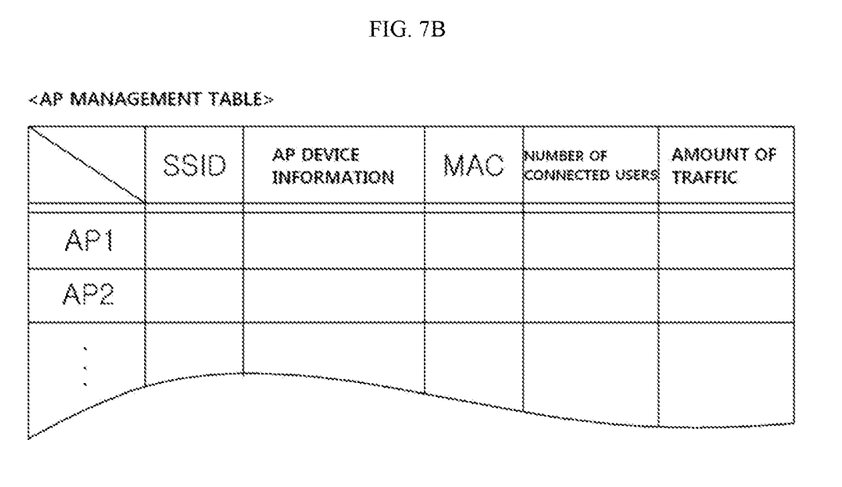
Figure 7C:
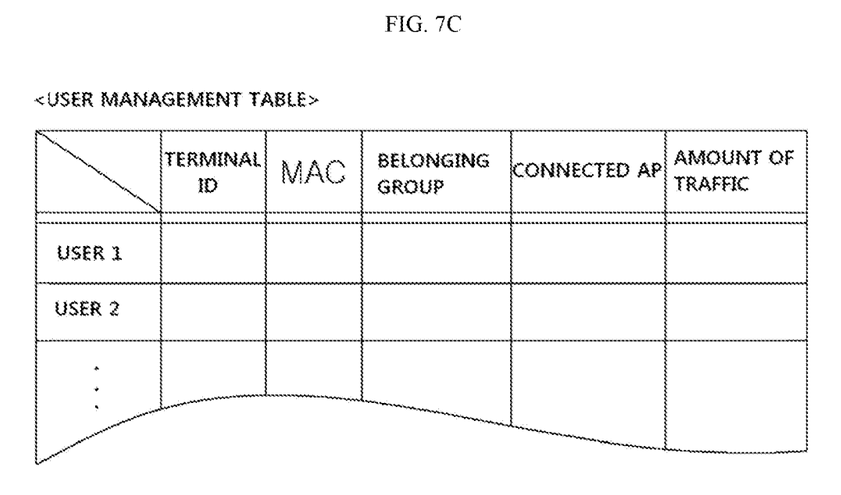

FIG. 7A to FIG. 7C schematically show a group management table, an AP management table, and a user management table that can be stored in a management server according to an exemplary embodiment of the present disclosure, respectively.

The management server 10 may store data necessary to classify a plurality of APs into AP groups and data necessary to assign an AP group to a terminal 30 in the storage 150.

In an exemplary embodiment, such data may include information on AP groups, information on APs and information on a user, and may be stored as a group management table, an AP management table and a user management table as exemplified in FIG. 7A to FIG. 7C.

Referring to FIG. 7A, a group management table may have data about a network zone identifier (ID), a group ID, belonging APs, the number of group users, and the amount of group traffic of each AP group.

Network zone IDs are IDs for identifying a plurality of network zones 40. When there is only one network zone to be managed by the management server 10, network zone IDs of all groups have the same value.

Group IDs are IDs for identifying respective AP groups, and belonging APs are APs belonging to respective AP groups as members. As an example, FIG. 7A shows belonging APs of group A and group B according to the exemplary embodiment of FIG. 3.

The number of group users denotes the total number of current users who have been assigned the corresponding group, and the amount of group traffic denotes the total amount of current traffic of the corresponding group.

Referring to FIG. 7B, an AP management table may have data about a service set ID (SSID), AP device information, a MAC address, the number of connected users, and the amount of traffic of each AP.

An SSID is an ID for identifying each AP, and an ID other than an SSID may be used according to exemplary embodiments.

AP device information may include unique device information on each AP device. AP device information includes, for example, the following information, and is not limited thereto.

Location of AP: Physical location and/or relative location
Authentication Method: WiFi protected access (WPA), wired equivalent privacy (WEP), and so on
Radio Channel in Use
Bandwidth
Available Connection Method: IEEE 802.11 a/b/g/n
Maximum Number of Connected Users
Maximum Size of Service Area A MAC address is a unique ID of an AP device, the number of connected users is the number of users who are currently connected to the corresponding AP, that is, the number of mobile terminals 30, and the amount of traffic denotes the total amount of traffic caused by users who are currently connected to the corresponding AP.

Referring to FIG. 7C, a user management table may have data about a terminal ID, a MAC address, a belonging group, a connected AP, and the amount of traffic of each user.

A terminal ID is an ID for identifying a terminal used by a user, and a MAC address is a unique ID of a terminal. In an exemplary embodiment, a MAC address of a terminal may be used as a terminal ID.

A belonging group denotes an ID of a group assigned to a user, and a connected AP denotes an AP that is currently connected with a user. The amount of traffic denotes the amount of traffic currently generated by the corresponding user.

The above-described management tables of FIG. 7A to FIG. 7C are merely exemplary embodiments for describing the present disclosure. Thus, according to various exemplary embodiments, some data items in the management tables may be removed, or new data items may be added.

In addition, those familiar with this field will appreciate that each of the management tables of FIG. 7A to FIG. 7C need not be stored as one table. Each management table may be divided into a plurality of management tables and stored, or may be stored in an arbitrary form among various data structure forms or in the form of a database (DB).

Figure 8:
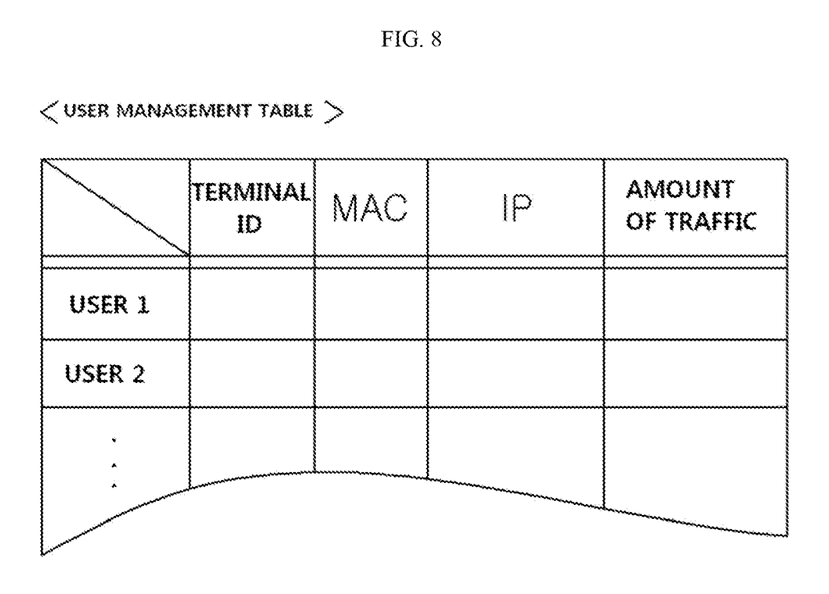
FIG. 8 shows a user management table that can be stored in an AP according to an exemplary embodiment of the present disclosure.

FIG. 8 shows a user management table that can be stored in an AP according to an exemplary embodiment of the present disclosure.

Each AP 50 in a network zone may store the user management table shown in FIG. 8 in its storage 520.

Referring to FIG. 8, the user management table may have data about a terminal ID, a MAC address, an IP address, and the amount of traffic of each user.

A terminal ID, a MAC address and the amount of traffic are the same as described with reference to FIG. 7C. An IP address may be, for example, a private IP address that is assigned to a terminal of each user by a currently connected AP.

In another exemplary embodiment, the user management table of FIG. 8 may further include an item showing a belonging AP group of each user.

The management table of FIG. 8 is merely an exemplary embodiment for describing the present disclosure, and according to various exemplary embodiments, some data items in the management tables may be removed or added. In addition, it will be understood that the management table of FIG. 8 is not limited to the form of a table, but may be stored in an arbitrary data storage format.

Figure 9:
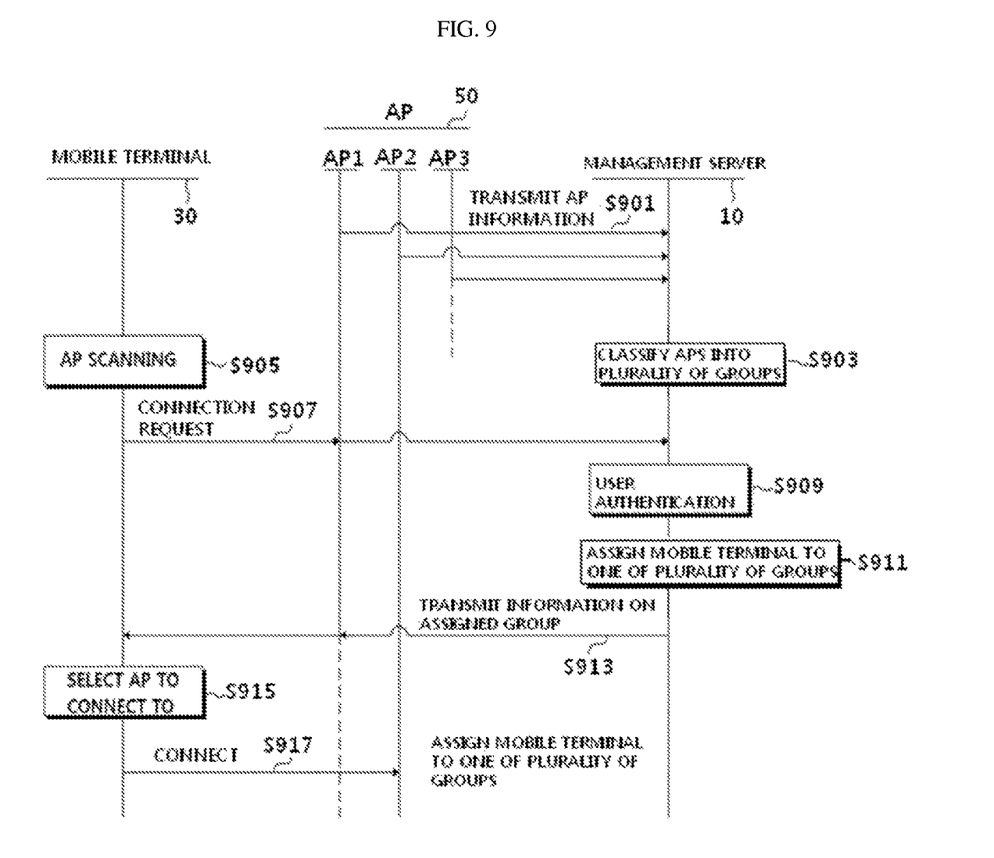
FIG. 9 is a flowchart illustrating operation of a mobile terminal, an AP, and a management server according to an exemplary embodiment of the present disclosure.

FIG. 9 is a flowchart illustrating operation of a mobile terminal, an AP, and a management server according to an exemplary embodiment of the present disclosure.

Referring to FIG. 9, in step S901, a management server 10 receives AP information from all APs 50 in a network zone 40. Although only AP1 to AP3 are shown in FIG. 9 for convenience, the APs 50 may include more APs.

In an exemplary embodiment, the AP information may include AP device information, and real-time information such as the number of connected users and the amount of traffic.

In step S903, a group manager 110 of the management server 10 classifies the APs 50 into a plurality of groups based on AP device information on all the APs 50 in the network zone 40. In other words, it is possible to generate a plurality of AP groups consisting of at least one AP as described with reference to FIG. 3 to FIG. 6.

In an alternative embodiment, the management server 10 may transmit information on an AP group to which each AP 50 belongs (e.g., a group ID of a belonging group) to the AP 50.

In the meantime, a mobile terminal 30 of a user who enters the network zone 40 may scan surrounding connectable APs in step S905, and may transmit a connection request to the management server 10 through an arbitrary AP in step S907.

Next, in step S909, the management server 10 receiving the connection request may determine whether the mobile terminal 30 has already been assigned an AP group. When the terminal 30 has not been assigned an AP group, a group assignor 120 of the management server 10 assigns one of the AP groups to the terminal 30 in step S911.

In an alternative embodiment, step S909 may be omitted. In other words, when there is a connection request of a user, the management server 10 may immediately operate to assign an AP group to the corresponding terminal.

Subsequently, in step S913, the management server 10 transmits information on the assigned group to the terminal 30. Preferably, the information on the group is an AP list of the group.

Next, when there are at least two currently connectable APs in the AP list of the group, the terminal 30 receiving the information on the assigned group (e.g., the AP list of the group) selects one of the connectable APs (step S915), and performs a connection operation to the selected AP (step S917).

Figure 10:
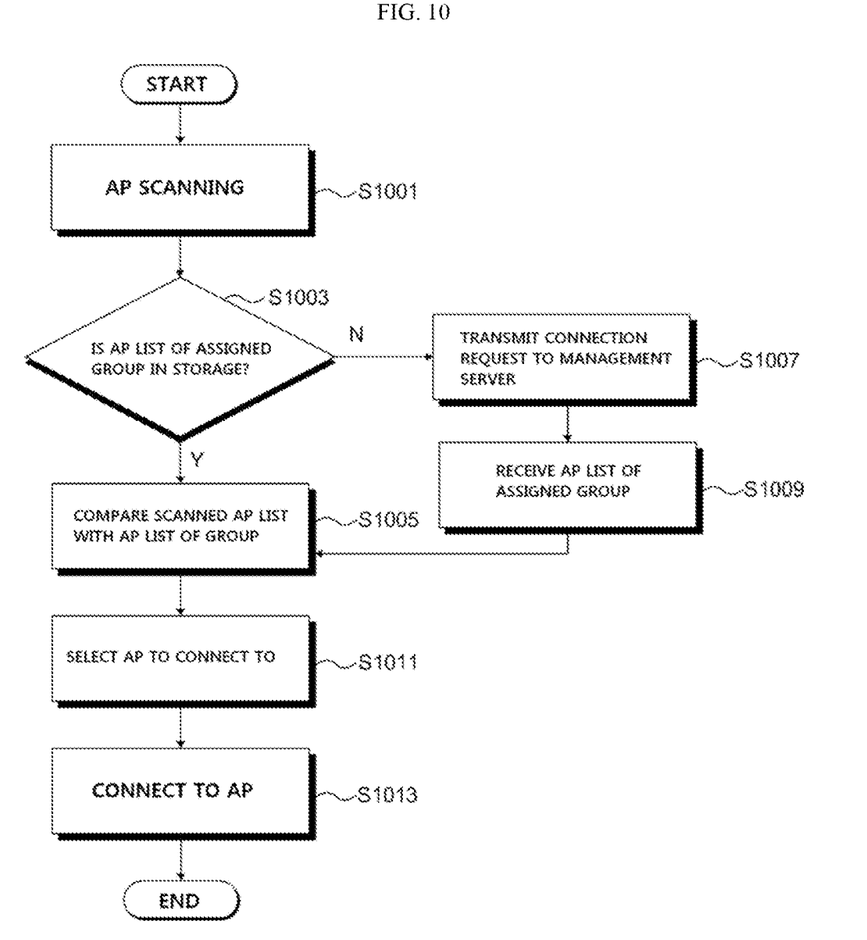
FIG. 10 is a flowchart illustrating a step in which a mobile terminal is assigned one group according to an exemplary embodiment of the present disclosure.

FIG. 10 is a flowchart illustrating a step in which a mobile terminal is assigned one group according to an exemplary embodiment of the present disclosure.

First, in step S1001, a mobile terminal 30 entering a network zone 40 may scan surrounding connectable APs, and generate a list of scanned APs.

In step S1003, a connection manager 310 of the terminal 30 determines whether an AP list of a group assigned by a management server 10 has been stored in its storage 330. When there is an AP list of the assigned group, the process proceeds to the next step S1005. On the other hand, when there is no AP list, the process proceeds to step S1007, and the connection manager 310 transmits a connection request to the management server 10.

When the management server 10 assigns one of the plurality of AP groups to the terminal 30 in response to the request, and transmits information on the assigned group to the terminal 30, the terminal 30 receives the information on the assigned group in step S1009. Preferably, the information on the group is an AP list of the group.

Next, in step S1005, the connection manager 310 compares the list of APs scanned by an AP scanner 320 with the AP list of the group received from the management server 10, thereby checking whether there is a currently connectable AP in the AP list of the group.

When there are at least two currently connectable APs in the AP list of the group, the connection manager 310 selects one of the connectable APs (step S1011), and the mobile terminal 30 connects to the selected AP (step S1013).

Figure 11:
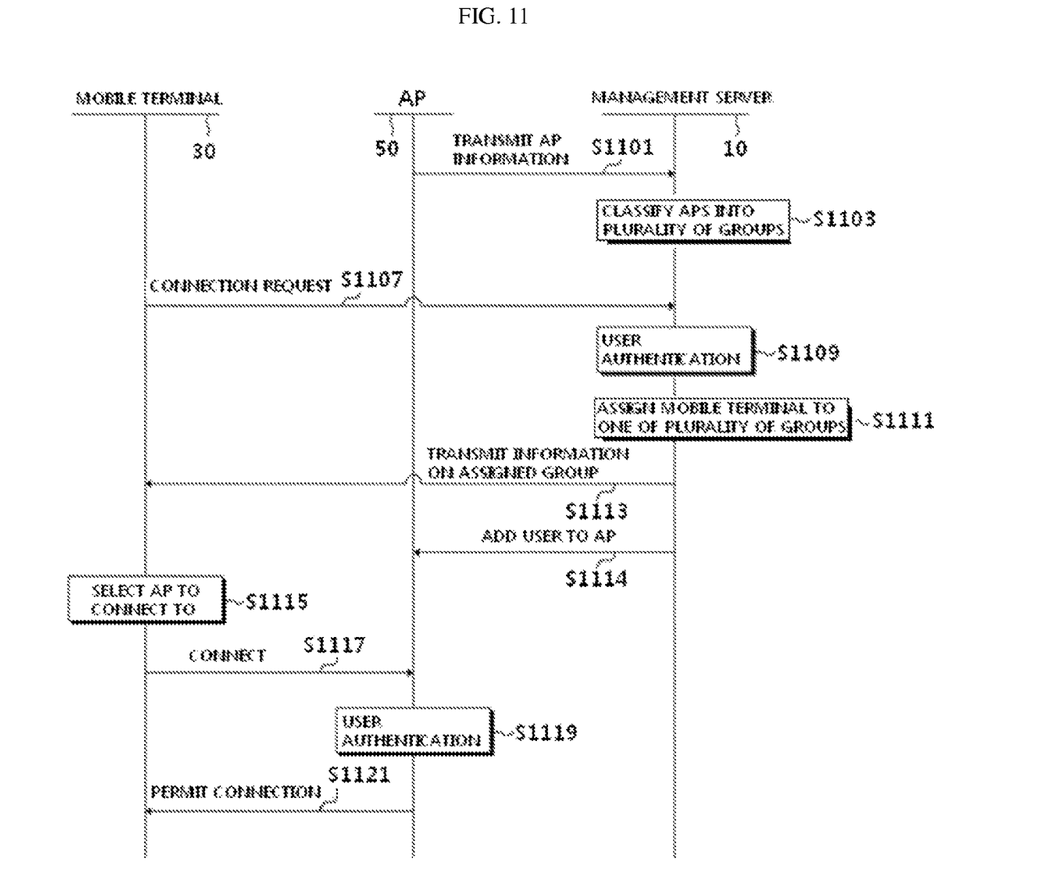
FIG. 11 is a flowchart illustrating operation of a mobile terminal, an AP, and a management server according to another exemplary embodiment of the present disclosure.

FIG. 11 is a flowchart illustrating operation of a mobile terminal, an AP, and a management server according to another exemplary embodiment of the present disclosure. FIG. 11 is similar to FIG. 9 except that, when a terminal 30 is outside a network zone 40, the terminal 30 may connect to a management server 10 and may be assigned an AP group, and when the terminal 30 enters the network zone 40 and makes a connection request, an AP 50 may perform user authentication.

Referring to FIG. 11, in step S1101, the management server 10 receives AP information from all APs 50 in the network zone 40. In an exemplary embodiment, the AP information may include AP device information, and real-time information such as the number of connected users and the amount of traffic.

In step S1103, a group manager 110 of the management server 10 classifies the APs 50 into a plurality of groups based on AP device information on all the APs 50 in the network zone 40. In an alternative embodiment, the management server 10 may transmit information on an AP group to which each AP 50 belongs (e.g., a group ID of a belonging group) to the AP 50.

In the meantime, in step S1107, the mobile terminal 30 outside the network zone 40 may transmit a connection request to the management server 10. This may be, for example, a situation in which a user wants to be assigned an AP group before he or she enters a network zone. In this case, the user may directly access the management server 10 via a wired Internet network without connecting to an AP 50 in the network zone 40.

Next, in step S1109, the management server 10 receiving the connection request determines whether the mobile terminal 30 has already been assigned an AP group. When the terminal 30 has not been assigned an AP group, a group assignor 120 of the management server 10 assigns one of the AP groups to the terminal 30 in step S1011.

In an alternative embodiment, step S1109 may be omitted. In other words, when there is a connection request of a user, the management server 10 may immediately operate to assign an AP group to the corresponding terminal.

Next, in step S1113, the management server 10 transmits information on the assigned group to the terminal 30. Preferably, the information on the group is an AP list of the group. At almost the same time as step S1113, in step S1114, the management server 10 may notify APs in the assigned group that the user has been added to the group.

Subsequently, when the terminal 30 receiving the information on the assigned group (e.g., the AP list of the group) enters the network zone 40, the terminal 30 performs AP scanning to generate a list of connectable APs, and compare the AP list of the assigned AP group received from the management server 10 in step S1113 with the connectable AP list. Thus, when there are at least two currently connectable APs in the AP list of the group, the terminal 30 selects one of the connectable APs (step S1115) and performs a connection operation to the selected AP (step S1117).

Then, in step S1119, the AP performs authentication of the user. Here, the user authentication may be, for example, an operation of determining whether or not the terminal 30 has connected to an AP in the correct AP group assigned to the terminal 30 itself. To this end, APs may have received information necessary for authentication among pieces of management information of FIG. 7A to FIG. 7C from the management server 10, and have stored the received information in advance.

Subsequently, when the user authentication in step S1119 is successful, the AP permits connection of the terminal 30 (step S1121), and the terminal 30 connects to the AP in the network zone 40.

In an alternative embodiment to the exemplary embodiment of FIG. 11, when the terminal 30 enters the network zone 40 and makes a connection request, the management server 10 may perform user authentication.

In this case, operation of step S1101 to step S1115 of FIG. 11 may be performed in the same way. However, there is a difference with the exemplary embodiment of FIG. 11 in that, when the terminal 30 transmits a connection request to the AP in step S1117, the AP transmits the connection request to the management server, and the management server 10 performs user authentication, and transmits a connection permission to the terminal through the AP.

Exemplary embodiments of the above-described present disclosure can be implemented as computer-readable codes in a computer-readable recording medium. The computer-readable recording medium includes all types of recording media in which data readable by a computer system is stored. Examples of the computer-readable recording medium include a ROM, a RAM, a CD-ROM, a magnetic tape, a floppy disk, an optical data storage, and so on. In addition, the computer-readable recording medium may be implemented in the form of carrier waves (e.g., transmission via the Internet). The computer-readable recording medium may be distributed to computer systems connected via a network, in which computer-readable codes can be stored and executed in a distributed manner.

At least one exemplary embodiment of the present disclosure provides a network zone management apparatus capable of appropriately distributing a load of a plurality of APs in a network zone in which the APs are installed to overlap, and a mobile terminal connection method using the apparatus, so that a network can be efficiently used.

At least one exemplary embodiment of the present disclosure provides a network zone management apparatus capable of reducing unnecessary and frequent handover operations of a mobile terminal in a network zone in which a plurality of APs are installed to overlap, and a mobile terminal connection method using the apparatus, so that data loss and delay time caused by handover can be reduced.

It will be apparent to those skilled in the art that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. An apparatus for managing a network zone, comprising:
    a storage that stores wireless access point (AP) device information related to APs in a network zone; and
    a group manager configured to define one or more AP groups, by assigning each of the wireless APs to at least one AP group, based on the stored AP device information;
    wherein, when the group manager defines more than one of the AP groups, the group manager defines each of the AP groups so that each of the AP groups respectively covers substantially the same entire network zone.

2. The apparatus of claim 1, wherein, when the group manager defines the one or more AP groups, the group manager operates in conformity with conditions including:
    (i) each of the APs is assigned to at least one of the AP groups, and
    (i) each of the AP groups includes at least one of the APs.

3. The apparatus of claim 1, wherein the AP device information includes, for the APs, one or more of:
    location information,
    authentication method information,
    radio channel usage information,
    bandwidth information,
    available connection method information,
    information indicating a maximum number of connected users, and
    information indicating a maximum service area size.

4. The apparatus of claim 1, further comprising a group assignor configured to assign a mobile terminal, entering the network zone, to one of the AP groups.

5. The apparatus of claim 4, wherein:
    the group assignor assigns the mobile terminal to one of the AP groups based on the AP device information; and
    wherein the AP device information includes received real-time AP information.

6. The apparatus of claim 5, wherein the received real-time AP information includes at least one of:
    current numbers of connected users, and
    current amounts of traffic of the APs.

7. The apparatus of claim 4, wherein the group assignor determines an assigning order of the AP groups, and assigns the mobile terminal to one of the AP groups based on the assigning order.

8. The apparatus of claim 1, wherein, when only one AP exists in a service area of the network zone and no replaceable AP is present in the service area, the only one AP is respectively assigned to the each of the AP groups.

9. A mobile terminal, comprising:
    a storage that stores a list of wireless access points (APs) defining an assigned AP group;
    an AP scanner configured to scan for surrounding wireless APs and obtain a list of scanned APs; and a connection manager configured to make a connection to a currently connectable one of the scanned APs also included in the assigned AP group;

wherein:

the assigned AP group is one of a plurality of AP groups in a network zone having a plurality of APs, and each of the plurality of AP groups covers substantially the same entire network zone.

10. The mobile terminal of claim 9, wherein the plurality of AP groups are generated such that (i) each of the AP groups covers substantially the same entire network zone, (ii) each of the APs is assigned to at least one of the AP groups, and (iii) each of the AP groups includes at least one of the APs.

11. The mobile terminal of claim 9, wherein the storage stores one or more of the scanned AP list and the list of wireless APs of the assigned AP group in a volatile memory.

12. The mobile terminal of claim 9, wherein, when only one AP exists in a service area of the network zone and no replaceable AP is present in the service area, the only one AP is respectively assigned to the each of the AP groups.

13. A mobile terminal connection method for execution by a processor of a management server, the method comprising:

acquiring AP device information on wireless access points (APs) of a network zone;

classifying the APs into AP groups based on the AP device information; and assigning the mobile terminal to connect to one of the APs of one of the AP groups, wherein each of the AP groups covers substantially the same entire network zone.

14. The method of claim 13, wherein the AP groups are determined in accordance with conditions comprising:

(i) each one of the APs is assigned to at least one of the AP groups, and (ii) each one of the AP groups includes at least one of the APs.

15. The method of claim 13, wherein the AP device information includes, for the APs, one or more of: location information, authentication method information, radio channel usage information, bandwidth information, available connection method information, information indicating a maximum numbers of connected users, and information indicating a maximum service area size.

16. The method of claim 13, further comprising:

receiving respective real-time AP information messages from one or more of the APs, the messages indicating one or more of:

a number of users respectively connected to the one of the APs, and a current traffic amount respectively handled via the one of the APs; and assigning the mobile terminal to the one of the AP groups based on the received real-time AP information.

17. The method of claim 13, wherein the assigning of the mobile terminal includes determining an assigning order of the AP groups, and assigning the mobile terminal to the one of the AP groups based on the assigning order.

18. The method of claim 13, further comprising, after the assigning of the mobile terminal to the one of the AP groups, transmitting to the mobile terminal a message indicating one or more of the APs comprising the assigned one of AP groups.

19. The method of claim 13, further comprising, before the assigning of the mobile terminal, determining, at the management server, whether the mobile terminal has already been assigned to one of the AP groups.

20. The mobile terminal connection method of claim 13, wherein, when only one AP exists in a service area of the network zone and no replaceable AP is present in the service area, the only one AP is respectively assigned to the each of the AP groups.

21. A computer program product comprising a non-transitory computer-readable recording medium storing instructions configured to enable a hardware processor of a computer system to implement operations intended to implement a management server that manages a connection of a mobile terminal, the operations comprising:

acquiring AP device information on wireless access points (APs) of a network zone;

classifying the APs into AP groups based on the AP device information; and assigning the mobile terminal to connect to one of the APs of one of the AP groups, wherein each of the AP groups covers substantially the same entire network zone.

22. The computer program product of claim 21, wherein, when only one AP exists in a service area of the network zone and no replaceable AP is present in the service area, the only one AP is respectively assigned to the each of the AP groups.

* * * * *